United States Patent
Simmons et al.

(10) Patent No.: US 8,842,091 B2
(45) Date of Patent: Sep. 23, 2014

(54) TWO-DIMENSIONAL TOUCH PANEL

(75) Inventors: Martin John Simmons, Hampshire (GB); Esat Yilmaz, Chandler's Ford (GB)

(73) Assignee: Atmel Corporation, San Jose, CA (US)

( * ) Notice: Subject to any disclaimer, the term of this patent is extended or adjusted under 35 U.S.C. 154(b) by 275 days.

(21) Appl. No.: 12/668,850

(22) PCT Filed: Jul. 7, 2008

(86) PCT No.: PCT/GB2008/002328
§ 371 (c)(1),
(2), (4) Date: Apr. 8, 2010

(87) PCT Pub. No.: WO2009/007704
PCT Pub. Date: Jan. 15, 2009

(65) Prior Publication Data
US 2010/0193258 A1 Aug. 5, 2010

Related U.S. Application Data

(60) Provisional application No. 60/949,376, filed on Jul. 12, 2007.

(51) Int. Cl.
*G06F 3/044* (2006.01)
*G06F 3/041* (2006.01)

(52) U.S. Cl.
CPC ............. *G06F 3/044* (2013.01); *G06F 3/0416* (2013.01)
USPC .......... 345/174; 345/173; 178/18.06

(58) Field of Classification Search
CPC .................................................. G06G 3/044
USPC .................. 345/173–178; 178/18.06
See application file for complete search history.

(56) References Cited

U.S. PATENT DOCUMENTS 5,463,388 A   10/1995   Boie et al.
5,730,165 A    3/1998   Philipp
(Continued)

FOREIGN PATENT DOCUMENTS

EP   0609021 A    8/1994
EP   1335318 A1   8/2003
(Continued)

OTHER PUBLICATIONS

Office Action and English translation for Chinese Patent Application 200880024011.6, Jun. 9, 2011.
(Continued)

*Primary Examiner* — Amr Awad
*Assistant Examiner* — Aaron Midkiff
(74) *Attorney, Agent, or Firm* — Baker Botts LLP

(57) ABSTRACT

A capacitive touch panel is provided capable of detecting multiple simultaneous touches. The touch panel delivers sets of capacitance signal values to a processor which computes the coordinates of single or multiple touch locations on the touch panel. The processing of each set is performed by (i) identifying the sensing element having the largest capacitance signal value; (ii) defining a region around that sensing element; and (iii) repeating the process iteratively, wherein each subsequent identifying step excludes signals that lie in previously defined regions. A multi-touch sensor is thus provided in which the signal processing is based on successive definition of regions or sub-blocks in the touch panel. The touch location in each region can be determined more accurately by then applying interpolation between the adjacent signal values. This allows for position resolution at a finer scale than that defined by the touch panel's electrode patterning.

16 Claims, 11 Drawing Sheets

(56) References Cited

U.S. PATENT DOCUMENTS

| | | | |
|---|---|---|---|
| 5,825,352 | A | 10/1998 | Bisset et al. |
| 5,880,411 | A * | 3/1999 | Gillespie et al. ........... 178/18.01 |
| 6,323,846 | B1 * | 11/2001 | Westerman et al. .......... 345/173 |
| 6,452,514 | B1 | 9/2002 | Philipp |
| 6,466,036 | B1 | 10/2002 | Philipp |
| 6,993,607 | B2 | 1/2006 | Philipp |
| 7,304,638 | B2 * | 12/2007 | Murphy ........................ 345/173 |
| 7,663,607 | B2 | 2/2010 | Hotelling |
| 7,875,814 | B2 | 1/2011 | Chen |
| 7,876,310 | B2 * | 1/2011 | Westerman et al. .......... 345/173 |
| 7,920,129 | B2 | 4/2011 | Hotelling |
| 8,031,094 | B2 | 10/2011 | Hotelling |
| 8,031,174 | B2 | 10/2011 | Hamblin |
| 8,040,324 | B2 * | 10/2011 | Chiu et al. .................... 345/173 |
| 8,040,326 | B2 | 10/2011 | Hotelling |
| 8,049,732 | B2 | 11/2011 | Hotelling |
| 8,179,381 | B2 | 5/2012 | Frey |
| 2005/0114369 | A1 | 5/2005 | Gould et al. |
| 2009/0315854 | A1 | 12/2009 | Matsuo |
| 2012/0242588 | A1 | 9/2012 | Myers |
| 2012/0242592 | A1 | 9/2012 | Rothkopf |
| 2012/0243151 | A1 | 9/2012 | Lynch |
| 2012/0243719 | A1 | 9/2012 | Franklin |

FOREIGN PATENT DOCUMENTS

| | | |
|---|---|---|
| EP | 1381160 A | 1/2004 |
| WO | WO-9938149 A | 7/1999 |
| WO | WO 2012/129247 | 9/2012 |

OTHER PUBLICATIONS

"International Application Serial No. PCT/GB2008/002328, Written Opinion mailed Nov. 4, 2008", 6 pgs.

"Application Serial No. PCT/GB2008/002328, International Search Report mailed Nov. 4, 2008", 3 pages.

U.S. Appl. No. 61/454,936, filed Mar. 21, 2011, Myers.

U.S. Appl. No. 61/454,950, filed Mar. 21, 2011, Lynch.

U.S. Appl. No. 61/454,894, filed Mar. 21, 2011, Rothkopf.

Office Action of the Intellectual Property Office, and English Translation of Text of the Office Action; Taiwan Patent Application No. 097126553, Issued Date Mar. 3, 2014 Reported Apr. 3, 2014.

* cited by examiner

| 25 | 11 | 4 |
|----|----|---|
| 9  | 18 | 2 |
| 1  | 2  | 0 |
| 3  | 12 | 19 |
| 1  | 16 | 21 |
(RAW)
FIG. 4A
| 22 | 8  | 1 |
|----|----|---|
| 8  | 15 | 0 |
| 0  | 0  | 0 |
| 0  | 9  | 16 |
| 0  | 13 | 18 |
(SUB BACKGROUND)
FIG. 4B
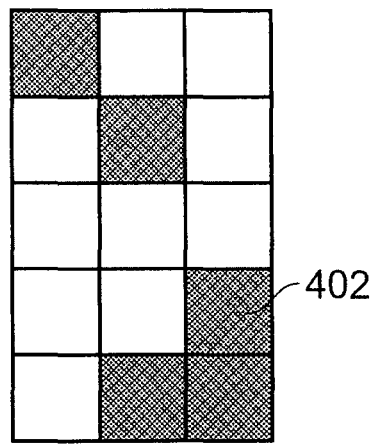
FIG. 4C
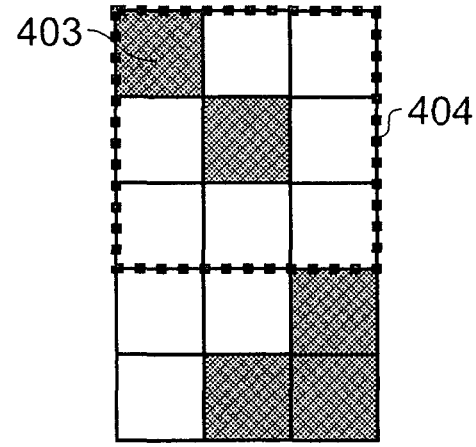
FIG. 4D

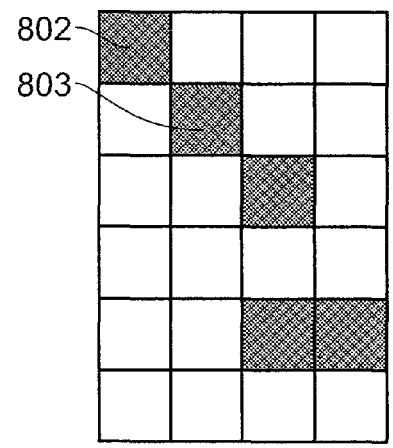
| 25 | 11 | 3  | 1  |
|----|----|----|----|
| 11 | 27 | 10 | 2  |
| 1  | 11 | 10 | 4  |
| 2  | 6  | 6  | 4  |
| 3  | 2  | 17 | 21 |
| 1  | 2  | 2  | 4  |
(RAW)
FIG. 8A
FIG. 8B
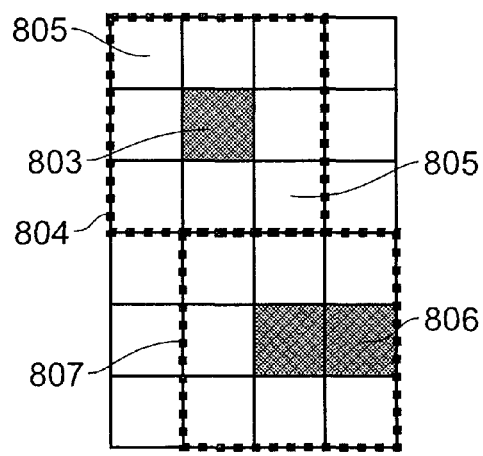
FIG. 8C
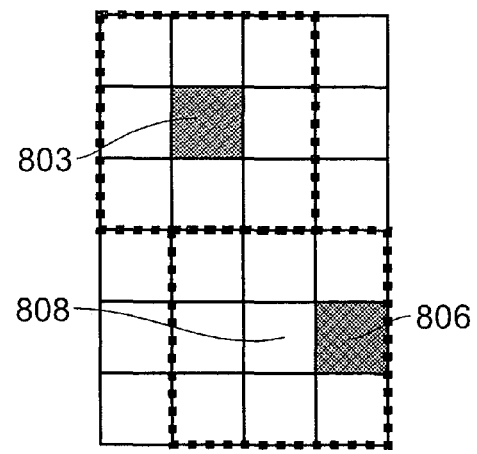
FIG. 8D

TWO-DIMENSIONAL TOUCH PANEL

RELATED APPLICATION

This application is a U.S. National Stage Filing under 35 U.S.C. 371 from International Patent Application Serial No. PCT/GB2008/002328, filed Jul. 7, 2008, and published on Jan. 15, 2009 as WO 2009/007704 A1, which claims the benefit of U.S. Provisional Application Ser. No. 60/949,376, filed on Jul. 12, 2007, the content of which are incorporated herein by reference in their entirety.

BACKGROUND OF THE INVENTION

The invention relates to a two-dimensional (2D) touch panel, more especially a touch panel that operates with capacitive touch sensing.

2D touch panels based on capacitive sensing are in widespread use in a variety of applications. Typically, the 2D touch panels are actuated by a finger, either in direct contact, or through proximity (i.e. without contact). For example, they are used as touchpads of laptop computers, in control panels of domestic appliances such as microwave ovens and cooktops, and as overlays to displays on hand held devices, such as mobile telephones. Many other applications are known in the art.

Most conventional designs of 2D touch panel are designed in a way which means that the touch panel can only detect a single touch at any one time. This is adequate for a large range of applications. However, for some applications, it is desirable for a 2D touch panel to be able to sense two or more touches simultaneously.

For example, as is well known, computers are conventionally controlled by a mouse, which combines two or three sensors, namely the tracking ball for the cursor motion and two buttons for selection of icons at the cursor position. A mouse thus combines cursor motion through movement of the mouse device, and two finger actions for actuating the left and right mouse buttons. In a laptop, the mouse functions are provided by a touchpad with adjacent buttons. A user moves the cursor through sliding one finger over the touchpad area, and selects icons and so forth by actuation the two "mouse" buttons with his or her thumb, or one or two other fingers.

Another example of a device that requires multiple simultaneous finger inputs is a hand-held games console, where typically the left and right thumbs are used to control different functions of the device, or jointly to control the same function. Controllers for in-flight entertainment systems often have a similar mode of operation.

A 2D capacitive touch panel capable of sensing multiple simultaneous touches is known in the prior art, and is now described.

FIG. 1 schematically summarises the prior art touch panel of U.S. Pat. No. 5,825,352 [reference 1] which is capable of detecting multiple touches simultaneously. An array sensor is formed by a touch pad matrix 101 with a plurality of wires extending in each of the x and y directions to form sensor line rows and columns respectively. The array sensor is scanned using a multiplexer 102 that is connected to the array sensor 101, which is controlled by a microcontroller 105. The capacitance of each of the sampled x and y wires is then measured using capacitance measuring circuitry 103. For calibration purposes, the sensor scans itself during a period when no finger actuations are present to determine a background signal level. The background capacitance level is measured and stored, and then subtracted from each scan of the sensor array, to determine the finger-induced capacitance. The scanned outputs from each sensor row and column in the sensor array are converted into a digital representation using an analogue-to-digital converter (ADC) 104 which supplies the digitised signals to the microcontroller 105. The scanned data are analysed in the x-direction and the y-direction of the array, either sequentially or concurrently. In the figure, the x-profile 107 and the y-profile 106 are illustrated schematically for a simultaneous touch of two fingers as illustrated on the array sensor 101. Referring to the x-profile 107, two maxima 108 and 110 are evident, one for each finger touch. The two maxima are separated by a minimum 109. Referring to the y-profile 106, only one maximum is evident, which is a result of the two finger touches being close together in the y-direction.

In this prior art device, the signals from the x-lines are analysed separately from the signals from the y-lines. In each of x and y, maxima and minima are identified, wherein maxima are designated as finger touches. A second maximum requires that a minimum is identified following the first maximum. Maxima are identified as the largest local variation in a signal. Minima are identified as a local minimum adjacent to a peak. After the maxima have been identified in each of the x and y directions, the value of each peak is compared to a threshold. If the value of the peak is less than the threshold it is no longer considered to be a peak. A similar function can be applied to the minima, whereby the value must be less than a given threshold value. The peak and valley data in the x and y directions are then interpolated to identify the location of one or more fingers on the sensor array. This technique is used for detecting and processing multiple simultaneous touches on a sensor array so that a first finger can be used to control a cursor (similar to a conventional touch pad on a laptop computer) and a second finger to provide actuations (similar to a conventional mechanical button provided adjacent to a touch pad).

While this prior art design provides a technically well-engineered solution for simultaneous multi-touch processing, it requires a large number of sensor lines in both x and y in order to provide sufficient spatial resolution. A minimum of approximately 10×10 lines would be required to resolve two simultaneous touches. More typically, perhaps at least 20×20 lines would be needed for sufficient reliability and accuracy, and to cope with more than two simultaneous touches. However, for mass-production devices, cost scales with the number of signal processing lines required, i.e. the number of lines in the capacitance measuring circuitry, ADC, and digital signal processor.

It would therefore be desirable to provide a multi-touch array sensor that could be constructed with a reduced number of sensor lines.

SUMMARY OF THE INVENTION

According to the invention there is provided a 2D touch-sensitive capacitive position sensor comprising:

(a) a touch panel having a plurality of sensing elements distributed over its area;

(b) a capacitance measurement circuit connected to the sensing elements and operable repeatedly to acquire sets of capacitance signal values, each set being made up of a capacitance signal value from each of the sensing elements; and (c) a processor connected to receive the sets of capacitance signal values and operable to process each set to compute and output coordinates of single or multiple touch locations on the touch panel, the processing of each set being performed by:

(i) identifying the sensing element having the largest capacitance signal value;

(ii) defining a region of the touch panel including said sensing element having the largest capacitance signal value and selected ones of its neighbours;

(iii) identifying and defining one or more further sensing elements and regions respectively, wherein each iteration excludes capacitance signal values from consideration if they lie in previously defined regions of the touch panel; and (iv) outputting data indicating the coordinates of the touch location in each region identified.

A simple and reliable multi-touch sensor is thus provided in which the signal processing is based on successive definition of regions or sub-blocks in the touch panel in which signals are excluded in subsequent touch identification steps. This approach can be thought of as an adaptation of the adjacent key suppression (AKS) method of U.S. Pat. No. 6,993,607 [reference 4]. AKS was originally developed for scanning an entire touch panel surface in each data acquisition cycle. The current method differs from conventional AKS in that AKS is applied, not once for the whole key array, but iteratively to sub-blocks of the touch panel, to filter out some keys, i.e. those adjacent to an identified touch location, at each processing stage. The purpose of this localised form of AKS is to exclude keys adjacent to a touch already identified from the search for further valid touches. This is a reliable and simple processing approach which deals with both dimensions, i.e. x and y, together. Specifically, processing according to the invention avoids carrying out the complex signal processing methods of U.S. Pat. No. 5,825,352, which effectively amount to providing a curve fitting analysis to identify both maxima and minima. In particular, identification of minima is not a feature of the present invention, whereas in U.S. Pat. No. 5,825,352 it is an essential prerequisite to resolve multiple touches. Moreover, processing according to the invention avoids having to process data from each of two dimensions separately.

The identifying steps preferably exclude from consideration any sensing elements with capacitance signal values that are not above a threshold value. The to iterative identification of one or more touch locations is thus confined to higher capacitive signal values. The threshold may be fixed or variable. A suitable threshold value may be re-calculated, for example during a sequence of measurements or on power-up of the device that has the touch panel sensor.

In some implementations, the sensing element in each region that has the largest capacitance value is taken to be the principally actuated sensing element of that region. In other implementations, the sensing element in each region that is at the highest position on the touch panel among those sensing elements that have a capacitance signal value above a threshold value is taken to be the principally actuated sensing element of that region. Other algorithms may be applied to determine which of the sensing elements is to be taken to be the principal one. Furthermore, in some embodiments, the method does not require the identification of a principal sensing element.

In a simple version of the invention, the touch location in each region is taken to be at the principally actuated sensing element.

In the best mode of the invention, the touch location in each region is determined by applying interpolation between the capacitance signal values of at least some of the sensing elements in that region. This allows for a better position resolution in the output than is possible from the sensing elements alone. As a result, a relatively coarse grid of sensing elements is capable of delivering position resolution on a finer scale than the scale of the grid. A simple and reliable multi-touch sensor is thus provided which can be implemented with a relatively low number of sensing elements. Consequently, the capacitance measurement circuit need only comprise a relatively low number of sensing channels.

Various forms of interpolation are possible. For example, the interpolation can be limited to the sensing element identified as being the principally actuated sensing element of the region and its neighbours. Another alternative is for the interpolation to include all of the sensing elements in each region.

The invention also envisages a method of processing signals from a 2D touch-sensitive capacitive position sensor comprising: (a) a touch panel having a plurality of sensing elements distributed over its area; (b) a capacitance measurement circuit connected to the sensing elements and operable repeatedly to acquire sets of capacitance signal values, each set being made up of a capacitance signal value from each of the sensing elements; and (c) a processor connected to receive the sets of capacitance signal values and operable to process each set to compute and output coordinates of single or multiple touch locations on the touch panel, the method of processing each set comprising:

(i) identifying the sensing element having the largest capacitance signal value;

(ii) defining a region of the touch panel including said sensing element having the largest capacitance signal value and selected ones of its neighbours;

(iii) identifying and defining one or more further sensing elements and regions respectively, wherein each iteration excludes capacitance signal values from consideration if they lie in previously defined regions of the touch panel; and (iv) outputting data indicating the coordinates of the touch location in each region identified.

The invention may be implemented using either passive or active capacitive sensing techniques.

Passive capacitive sensing devices rely on measuring the capacitance of a sensing electrode to a system reference potential (earth). The principles underlying this technique are described in U.S. Pat. No. 5,730,165 [reference 6] and U.S. Pat. No. 6,466,036 [reference 7], for example. The contents of U.S. Pat. No. 5,730,165 and U.S. Pat. No. 6,466,036 are incorporated herein in their entirety by reference as describing background material to the invention. In broad summary, passive capacitive sensors employ sensing electrodes coupled to capacitance measurement circuits. Each capacitance measurement circuit measures the capacitance (capacitive coupling) of its associated sensing electrode to a system ground. When there is no pointing object near to the sensing electrode, the measured capacitance has a background or quiescent value. This value depends on the geometry and layout of the sensing electrode and the connection leads to it, and so on, as well as the nature and location of neighbouring objects, e.g. the sensing electrodes proximity to nearby ground planes. When a pointing object, e.g. a user's finger, approaches the sensing electrode, the pointing object appears as a virtual ground. This serves to increase the measured capacitance of the sensing electrode to ground. Thus an increase in measured capacitance is taken to indicate the presence of a pointing object.

U.S. Pat. No. 5,730,165 and U.S. Pat. No. 6,466,036 are primarily directed to discrete (single button) measurements, and not to 2D position sensor applications. However the principles described in U.S. Pat. No. 5,730,165 and U.S. Pat. No. 6,466,036 are readily applicable to 2D capacitive touch sensors (2DCTs), e.g. by providing electrodes to define either a 2D array of discrete sensing areas, or rows and columns of electrodes in a matrix configuration.

Active 2DCT sensors are based on measuring the capacitive coupling between two electrodes (rather than between a single sensing electrode and a system ground). The principles underlying active capacitive sensing techniques are described in U.S. Pat. No. 6,452,514 [reference 5]. The contents of U.S. Pat. No. 6,452,514 are incorporated herein by reference in their entirety as describing background material to the invention. In an active-type sensor, one electrode, the so called drive electrode, is supplied with an oscillating drive signal. The degree of capacitive coupling of the drive signal to the sense electrode is determined by measuring the amount of charge transferred to the sense electrode by the oscillating drive signal. The amount of charge transferred, i.e. the strength of the signal seen at the sense electrode, is a measure of the capacitive coupling between the electrodes. When there is no pointing object near to the electrodes, the measured signal on the sense electrode has a background or quiescent value. However, when a pointing object, e.g. a user's finger, approaches the electrodes (or more particularly approaches near to the region separating the electrodes), the pointing object acts as a virtual ground and sinks some of the drive signal (charge) from the drive electrode. This acts to reduce the strength of the component of the drive signal coupled to the sense electrode. Thus a decrease in measured signal on the sense electrode is taken to indicate the presence of a pointing object.

BRIEF DESCRIPTION OF THE DRAWINGS

For a better understanding of the invention, and to show how the same may be carried into effect, reference is now made by way of example to the accompanying drawings.

FIGS. 4A to 4H are a sequence of schematic views of the sensor array used to describe a specific example of the signal processing method of FIG. 3.

FIGS. 8A to 8D are a sequence of schematic views of the sensor array used to describe a specific example of the signal processing method of FIG. 7.

DETAILED DESCRIPTION

Figure 1:
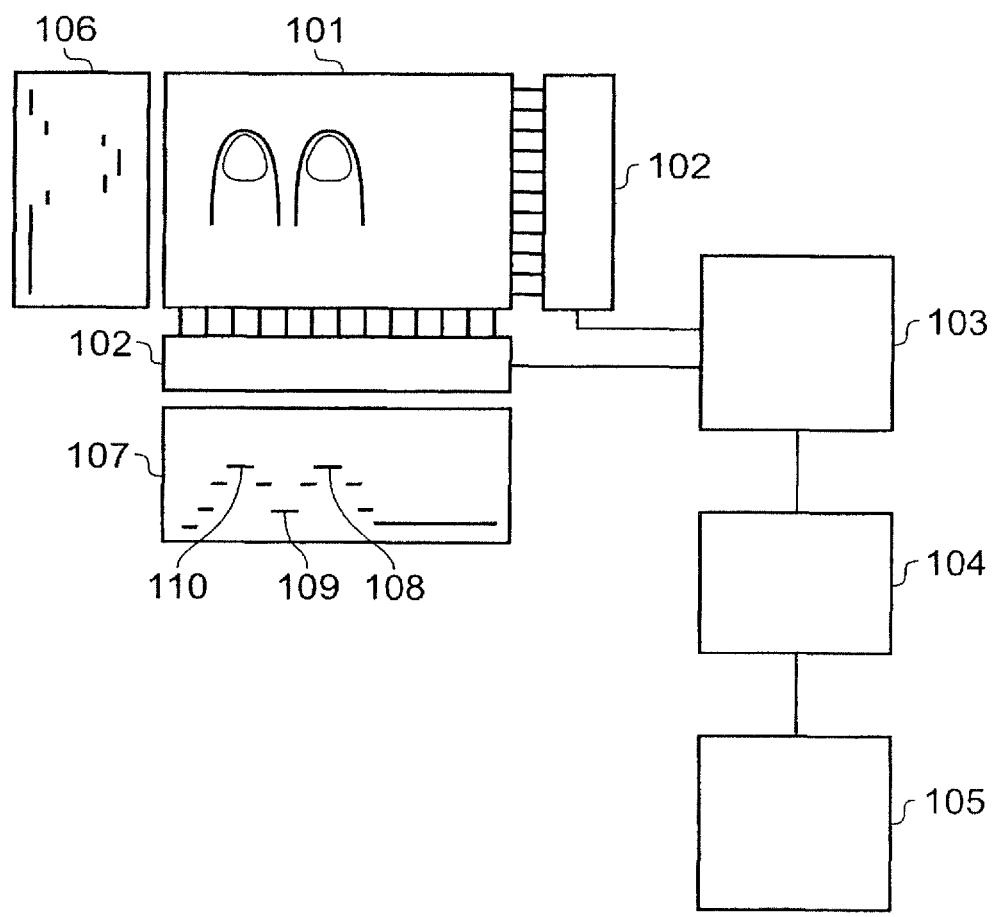
FIG. 1 is schematic view of a prior art capacitive position sensor array.
Figure 2:
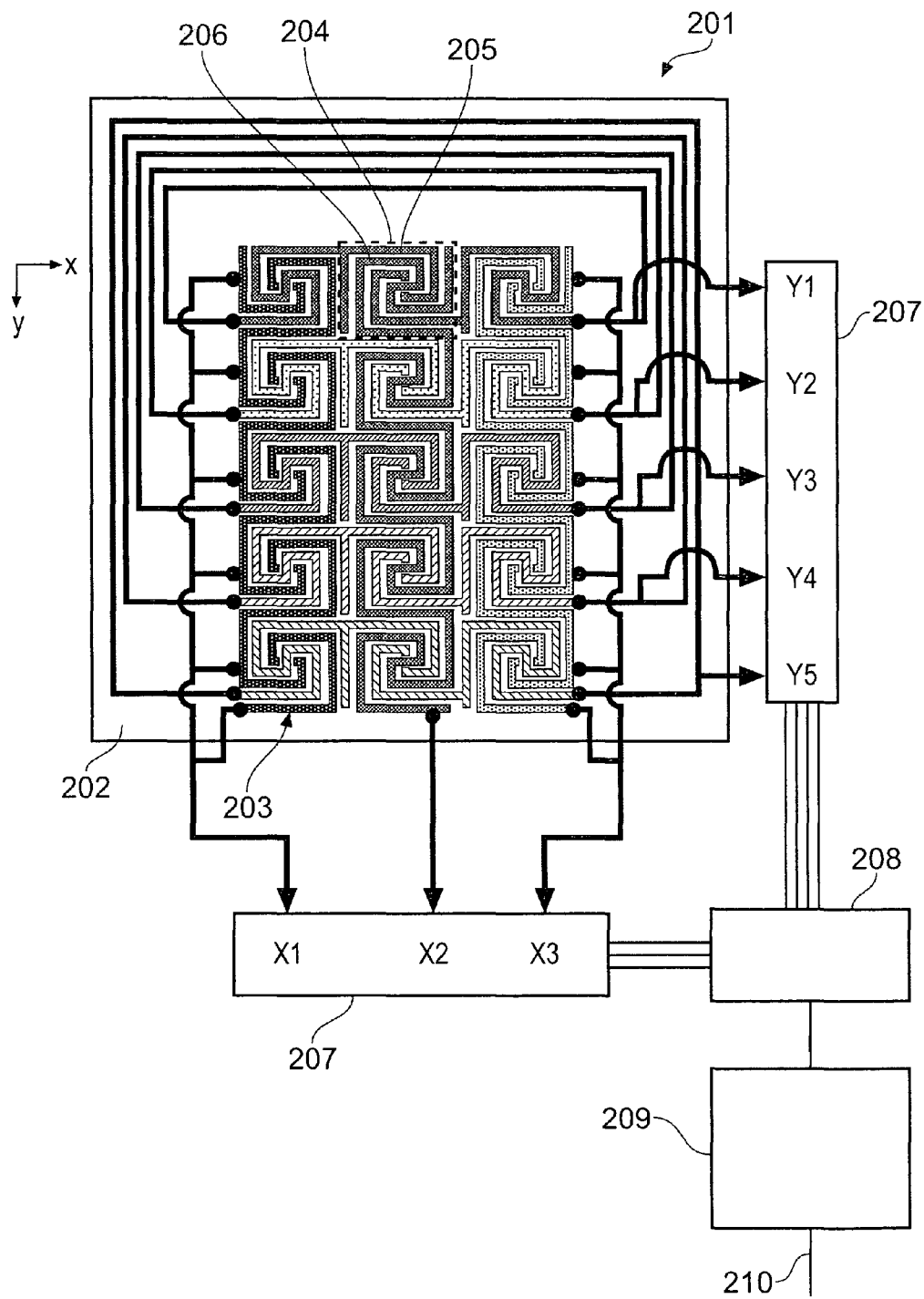
FIG. 2 is a schematic view of a capacitive position sensor array and associated circuitry according to a first embodiment of the invention.
Figure 3:
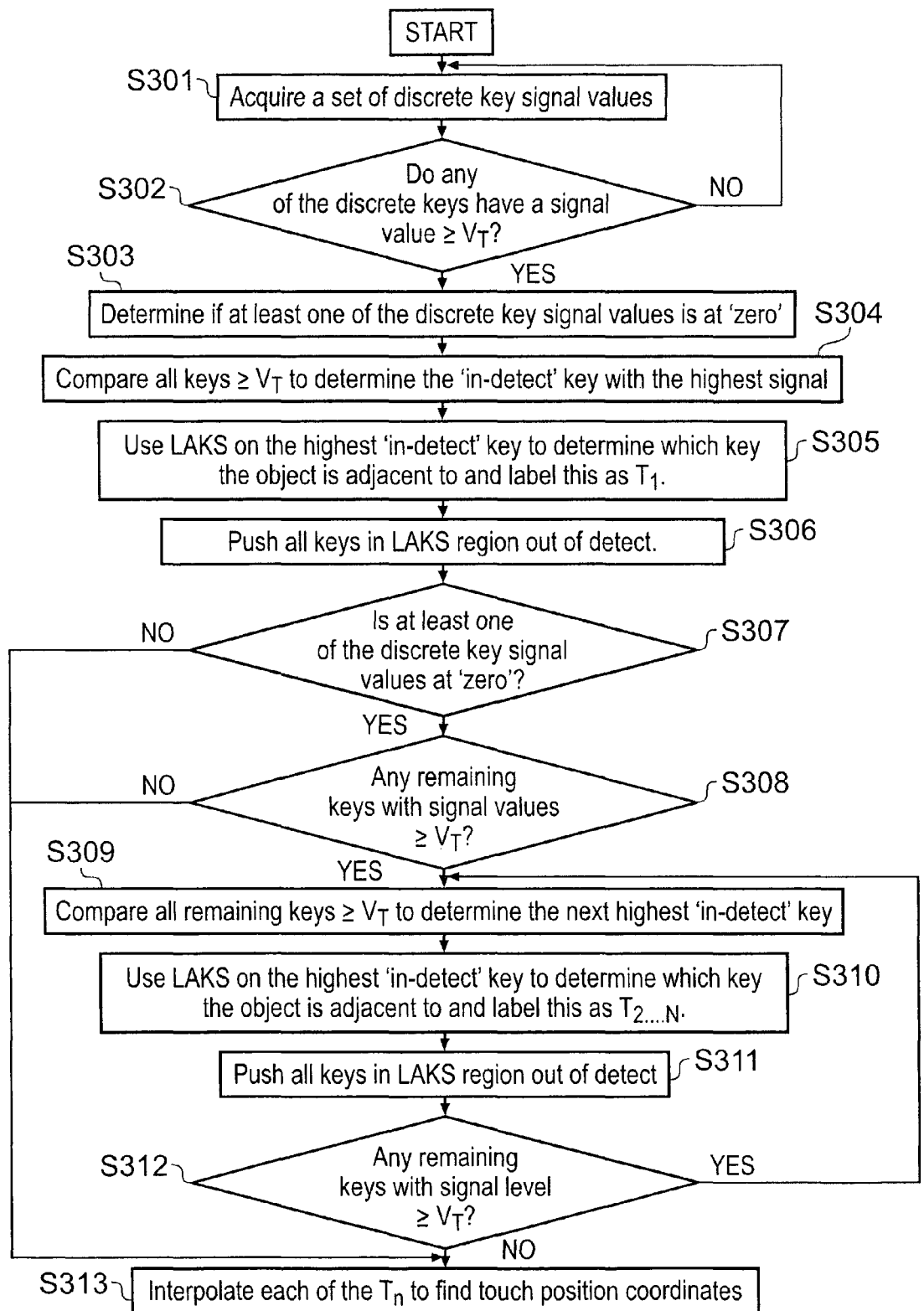
FIG. 3 is a flow chart of the signal processing method of the first embodiment.

FIG. 2 schematically shows in plan view a 2D touch-sensitive capacitive position sensor 201 according to a first embodiment of the invention. The 2D touch-sensitive capacitive position sensor will be used to describe how the algorithm shown in FIG. 3 is used to compute the position of multiple objects adjacent to the position sensor.

The 2D touch-sensitive capacitive position sensor 201 is operable to determine the position of objects along a first (x) and a second (y) direction, the orientation of which are shown towards the top left of the drawing. The sensor 201 comprises a substrate 202 having sensing electrodes 203 arranged thereon. The sensing electrodes 203 define a sensing area within which the position of an object (e.g. a finger or stylus) to the sensor may be determined. The substrate 202 is of a transparent plastic material and the electrodes are formed from a transparent film of Indium Tin Oxide (ITO) deposited on the substrate 202 using conventional techniques. Thus the sensing area of the sensor is transparent and can be placed over a display screen without obscuring what is displayed behind the sensing area. In other examples the position sensor may not be intended to be located over a display and may not be transparent; in these instances the ITO layer may be replaced with a more economical material such as a copper laminate Printed Circuit Board (PCB), for example.

The pattern of the sensing electrodes on the substrate 202 is such as to divide the sensing area into an array (grid) of sensing cells 204 arranged into rows and columns. (It is noted that the terms "row" and "column" are used here to conveniently distinguish between two directions and should not be interpreted to imply either a vertical or a horizontal orientation.) In this position sensor there are three columns of sensing cells aligned with the x-direction and five rows of sensing cells aligned with the y-direction (fifteen sensing cells in total). The top-most row of sensing cells for the orientation shown in FIG. 2 is referred to as row Y1, the next one down as row Y2, and so on down to row Y5. The columns of sensing cells are similarly referred to from left to right as columns X1 to X3.

Each sensing cell includes a row sensing electrode 205 and a column sensing electrode 206. The row sensing electrodes 205 and column sensing electrodes 206 are arranged within each sensing cell 204 to interleave with one another (in this case by squared spiraling around one another), but are not galvanically connected. Because the row and the column sensing electrodes are interleaved (intertwined), an object adjacent to a given sensing cell can provide a significant capacitive coupling to both sensing electrodes irrespective of where in the sensing cell the object is positioned. The characteristic scale of interleaving may be on the order of, or smaller than, the capacitive footprint of the finger, stylus or other actuating object in order to provide the best results. The size and shape of the sensing cell 204 can be comparable to that of the object to be detected or larger (within practical limits).

The row sensing electrodes 205 of all sensing cells in the same row are electrically connected together to form five separate rows of row sensing electrodes. Similarly, the column sensing electrodes 206 of all sensing cells in the same column are electrically connected together to form three separate columns of column sensing electrodes.

The position sensor 201 further comprises a series of capacitance measurement channels 207 coupled to respective ones of the rows of row sensing electrodes and the columns of column sensing electrodes. Each measurement channel is operable to generate a signal indicative of a value of capacitance between the associated column or row of sensing electrodes and a system ground. The capacitance measurement channels 207 are shown in FIG. 2 as two separate banks with one bank coupled to the rows of row sensing electrodes (measurement channels labelled Y1 to Y5) and one bank coupled to the columns of column sensing electrodes (measurement channels labelled X1 to X3). However, it will be appreciated that in practice all of the measurement channel circuitry will most likely be provided in a single unit such as a programmable or application specific integrated circuit. Furthermore, although eight separate measurement channels are shown in FIG. 2, the capacitance measurement channels could alternatively be provided by a single capacitance measurement channel with appropriate multiplexing, although this is not a preferred mode of operation. Moreover, circuitry of the kind described in U.S. Pat. No. 5,463,388 [reference 2] or similar can be used, which drives all the rows and columns with a single oscillator simultaneously in order to propagate a laminar set of sensing fields through the overlying substrate.

The signals indicative of the capacitance values measured by the measurement channels 207 are provided to a processor 208 comprising processing circuitry. The position sensor will be treated as a series of discrete keys. The position of each discrete key is the intersection of the x- and y-conducting lines. The processing circuitry is configured to determine which of the discrete keys has a signal indicative of capacitance associated with it. A host controller 209 is connected to receive the signals output from the processor 208, i.e. signals from each of the discrete keys indicative of an applied capacitive load. The host controller 209 is operable to compute the x and y locations of one or more simultaneous touches of the position sensor 201 and output them on an output connection 210.

The host controller 209 may be a single logic device such as a microcontroller. The microcontroller may preferably have a push-pull type CMOS pin structure, and an input which can be made to act as a voltage comparator. Most common microcontroller I/O ports are capable of this, as they have a relatively fixed input threshold voltage as well as nearly ideal MOSFET switches. The necessary functions may be provided by a single general purpose programmable microprocessor, microcontroller or other integrated chip, for example a field programmable gate array (FPGA) or application specific integrated chip (ASIC).

The layout and function of the 2D touch-sensitive capacitive position sensor 201 in FIG. 2 has been described. Now FIG. 3 and FIGS. 4A to 4H are used to describe the method which the processor 209 applies to determine the touched positions on the 2D touch-sensitive capacitive position sensor 201.

FIG. 3 is a flow diagram showing steps of the signal processing method embodied in hardware, firmware or software in the host controller 209. FIGS. 4A to 4H show the 3×5 array of touch buttons in the touch panel of the first embodiment in sequence at various points in the processing for an example set of touch inputs.

FIG. 4A shows a 3×5 grid with the raw data values of the signals acquired in a single acquisition in Step S301 of FIG. 3. Each of the grid squares represents one of the discrete keys of the capacitive position sensor 201. Two simultaneous finger touches are present at the positions indicated by the dashed lines. The raw data values are stated in arbitrary units. There is one finger touch near the top left of the panel and another finger touch near the bottom right of the panel.

FIG. 4B shows the signal values after a pre-processing step of subtracting a background signal value $V_B$ from the raw signal values. In this example, the background signal has a value $V_B=3$. In this example, the threshold signal value after background signal level subtraction is taken to be $V_t=12$.

FIG. 4C shows as shaded panels the positions of the five keys that have returned signals above the threshold, i.e. the in-detect keys. Each of the discrete keys is denoted by K(a,b), where 'a' is the column position, starting from '1' on the left of the grid and where 'b' is the row position, starting from '1' at the top of the grid (i.e. the shaded element 402 in FIG. 4A is K(3,4)). The location of the in-detect keys is K(1,1), K(2,2), K(2,5), K(3,4) and K(3,5).

It will be appreciated that the acquisition time may be fixed or variable. A fixed acquisition time would be set by the host controller, or processor. An example of a variable acquisition time would be when charge accumulation is terminated for the whole panel when one of the sense channel has accumulated to a certain threshold which may be a multiple of the in-detect threshold, for example twice the in-detect threshold.

In Step S301, the signal values of each of the discrete keys are acquired from the processing circuitry 208, which are indicative of an applied capacitive load to the position sensor 201.

In Step S302, it is determined whether there are any signals above threshold. If none of the signals acquired from the processing circuitry 208 is in-detect, the algorithm returns to Step S301 and acquires a new set of discrete key signal values. This will continue until either at least one of the discrete key signal value is greater than or equal to Vt or the loop is terminated by an appropriate control signal. It will be appreciated that the time interval between signal acquisitions may be increased with time if no above-threshold signals are received in order to save power. Another option is for the touch panel device to deactivate completely after a certain period of no signals being received above threshold, requiring a separate control input to reactivate, i.e. enter a sleep mode.

In Step 303, it is tested whether there is at least one signal at or below the background level in the acquired set of signals. To achieve this criterion there must be at least one of the discrete key signal values which is less than or equal to the predetermined background level signal, or 'zero' signal. The zero signal value is representative of the background signal level when no object is adjacent to the position sensor 201. Each of the discrete key signal values of the position sensor 201 is compared with the predetermined zero signal value in Step S303. The result of this test is used to make a decision later in the process flow.

In Step S304, all of the in-detect signal values are compared to one another to find the key with the highest signal value. The highest in-detect signal value is that of the discrete key at location K(1,1) 403. To find the location of the object at or near the discrete key at location K(1,1) 403 (i.e. the highest in-detect discrete key signal value) a modified implementation of Adjacent Key Suppression (AKS) is used. Conventional AKS is described in U.S. Pat. No. 6,993,607. The modified AKS method used here is referred to as localised AKS (LAKS) in the following. In conventional AKS, all keys are included in the analysis. However, in the present version of AKS, an iterative approach is used to the sensor array in which AKS is applied locally to a succession of sub-blocks or regions of the sensor array. The position of each sub-block is defined in relation to a selected in-detect element, and includes nearest neighbour and next nearest neighbour elements, i.e. discrete key positions immediately adjacent to the selected in-detect position and the discrete key positions that are adjacent to the immediately adjacent ones. The boundary within which the LAKS algorithm is performed in the present example is illustrated in FIG. 4D by the dashed boundary 404. The size of the sub-block for this example is limited by the size of the sensor array. However, if the sensor array contained more discrete keys the sub-block would be greater in size, in accordance with the definition above.

In Step S305, AKS is applied within the sub-block of keys defined by the boundary 404 to determine which of the keys in the sub-block is the one that should be associated with the touch, i.e. adjacent to the object. It is noted that this will often be the key with the highest signal value, but this is not necessarily the case. An example of a situation where a different key might be selected is a situation where the AKS method takes account of the hand shadow effect as described in EP 1335318A1 [reference 3]. For example, if a vertical line of keys is in-detect, the key output by the AKS method will be the topmost key even if that key is not the key with the highest signal value. In the illustrated example, AKS determines that the discrete key at location K(1,1) is the key which is adjacent to the touch, this key also being the key with the highest signal. This selected key 405 is labelled T1.

Figure 4E:
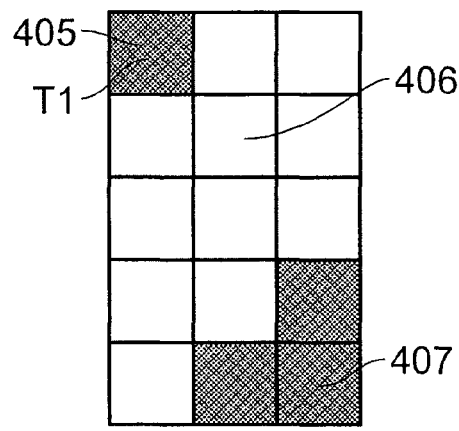

In Step S306, the other 'in-detect' key K(2,2) lying within the boundary of the LAKS sub-block (i.e. the dashed line) is now ignored in subsequent steps of the method specific to LAKS, i.e. its signal is suppressed from subsequent LAKS steps. It may thus be considered to have been "pushed out" of detect. This is illustrated in FIG. 4E by the "unshading" of grid square 406. Although any in-detect keys that are pushed out of detect by the LAKS are no longer included in this part of the detection algorithm, they may be included in a later part of the method, as will be understood further below.

In Step S307, if it was determined in Step S303 that there is no key with a zero signal, then process flow jumps to Step S313. This jump rules out the possibility of detecting further touches, on the basis that if there is no key with zero signal, then there is no reliable minimum, and hence multiple touches cannot be reliably distinguished from a situation where there is a single touch over a large area, perhaps over the whole panel. On the other hand, if it was determined in Step S303 that there is at least one key above the background level, then the process flow passes to Step S308, since there remains the possibility of being able to reliably resolve multiple touches.

In Step S308, the signal values of the remaining discrete keys are compared to the threshold value Vt. If none of the remaining key signals is greater than or equal to the threshold value Vt, then the process flow jumps to Step S313. On the other hand, if there are in-detect array keys with a signal value greater than or equal to the threshold value Vt, then the LAKS process is repeated, based on the key with the next highest signal value. With the example inputs shown in FIG. 4, the remaining in-detect discrete key signal values lie at locations K(2,5), K(3,4) and K(3,5).

In Step S309, the signal values from the remaining in-detect keys are compared with one another to find the highest. The highest signal value is at discrete key location K(3,5) 407 in the example.

Figure 4F:
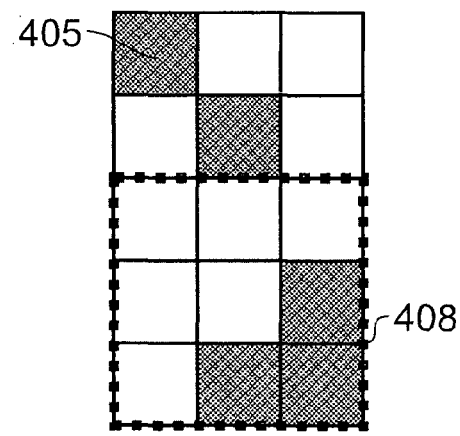

In Step S310, LAKS is carried out on the discrete keys lying in the LAKS sub-block formed around key K(3,5), i.e. the keys contained within the boundary shown in FIG. 4F within the dashed line boundary 408. The LAKS region includes all of the keys situated within the dashed line boundary 408. The LAKS processing decides which of the keys in the sub-block is the one most likely to be closest to the touch. In the following we assume that the discrete key at location K(3,5) is the one selected by the AKS. This key is labelled T2 as it is the key selected in the second iteration of the LAKS processing.

Figure 4G:
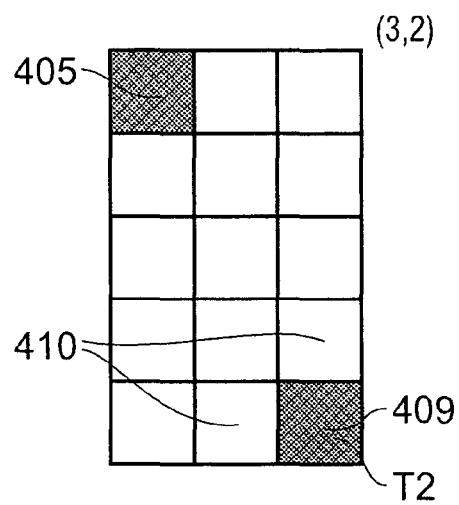

In Step S311, all of the other in-detect keys within the boundary defined by the LAKS (i.e. the dashed line 408) are pushed out of detect as shown in FIG. 4G by the now unshaded discrete locations K(2,5) and K(3,4) 410.

In Step S312, any remaining discrete key signal values are compared to the threshold value Vt. If none of the remaining key signals are greater than or equal to the threshold value Vt (as in the illustrated example), then Step S313 of the algorithm is executed. However, if there are any keys remaining with above-threshold signal values, the algorithm is repeated from Step S309 to S312 to assign a further discrete key T3. This process is repeated until Step S312 returns a null value.

At this point in the process, the LAKS processing is finished, and the process moves to a further stage, namely Step S313.

In Step S313, the coordinates of each of the touches T1, T2 ... TN is determined, where N may be one (a single touch) or more than one (multiple touches). The coordinates of each touch are determined using an interpolation method. The interpolation has access to all the signal values, whether above or below threshold. In other words, the signal values from any of the keys that were suppressed during the LAKS processing are used if required. In the example, the signal values available for the interpolation are the signal values shown in FIG. 4B, i.e. the raw signal values after background subtraction. For each touch Tn, the method interpolates using the signal values from the key Tn and its adjacent keys. There are various possible interpolation methods that can be used, but we describe only one in the following.

Two different equations are used to compute the x- and y-coordinates of the assigned touches. These are Equation 1 and Equation 2, show below. The terms in both of these equations have the following definition. 'Max' is the signal value of the discrete keys defined as T1 ... Tn. 'Mid' is the signal value of the discrete key with the highest signal value that is adjacent to 'Max'. 'Min' is the 'zero' signal value which was defined previously. $P_0$ is the offset which corresponds to the nearest x- or y-conducting line. For the x-coordinate $P_0=0$ for X1 and $P_0=1$ for X2. For the y-coordinate $P_0=0$ for Y1, $P_0=1$ for Y2, $P_0=2$ for Y3 and $P_0=3$ for Y4. Q is a number, representing a number of predefined discrete positions within each the discrete keys.

Equation 1 is used when the 'Mid' signal value is to the left of or below the 'Max' signal value. Equation 2 is used when the 'Mid' signal value is to the right of or above the 'Max' signal value.

$$P = P_0 + Q\left(\frac{\text{Max} - \text{Min}}{\text{Max} + \text{Mid} - 2\text{Min}}\right) \quad \text{(Equation 1)}$$

$$P = P_0 + Q - Q\left(\frac{\text{Max} - \text{Min}}{\text{Max} + \text{Mid} - 2\text{Min}}\right) \quad \text{(Equation 2)}$$

The procedure used for interpolating the position of the first assigned touch, T1 is as follows. To interpolate the x- and y-coordinates of T1, Equation 2 will be used because the 'Mid' signal value is to the right of the 'Max' signal value in the case of the x-coordinate and the 'Mid' signal value is to the above of the 'Max' signal value in the case of the y-coordinate.

FIG. 4B shows the signal values from the discrete keys after the background signal level $V_B$ ($V_B=3$) has been subtracted. The signal values in FIG. 4B will be used to find the x- and y-coordinates of T1 (discrete key location K(1,1)). The following discrete key signal values are used to find the x-coordinate of the touch adjacent to the position sensor 201. The 'Max' value is equal to the signal value of the discrete key at location K(1,1), Max=22. The 'Mid' value is equal to the signal value of the discrete key at location K(2,1), Mid=8. The 'Min' value is equal to the signal value of the discrete key at location K(3,3), Min=0. In the example of T1 each of the discrete keys is separated into 10 (Q=10) discrete positions. In the example of T1, $P_0$=0 because the detected touch is to the right of the first x-conducting line X1. The calculated x-coordinate for T1 is '2.6'. This is now repeated to find the y-coordinate of the detected touch adjacent to the position sensor 201.

The following signal values of the discrete keys are used to find the y-coordinate of the touch adjacent to the position sensor 201. The 'Max' value is equal to the signal value of the discrete key at location K(1,1), Max=22. The 'Mid' value is equal to the signal value of the discrete key at location K(1,2), Mid=6. The 'Min' value is equal to the signal value of the discrete key at location K(3,3), Min=0. In the example of T1 each of the discrete keys is separated into 10 (Q=10) discrete positions. In the example of T1, $P_0$=0 because the detected touch is below the first y-conducting line Y1. The calculated y-coordinate for T1 is '2.1'. Therefore the coordinates of the assigned touch T1 are (2.6, 2.1) or (3, 2) when rounded to the nearest integer value of Q.

The remaining touch position T2, shown in FIG. 4G is computed using the interpolation method described above. However, Equation 1 is used because the 'Mid' signal value for the x-coordinate is to the left of the 'Max' signal value and the 'Mid' signal value for the y-coordinate is above the 'Max' signal value. The computed coordinates for the assigned touch T2 are (16, 35).

Figure 4H:
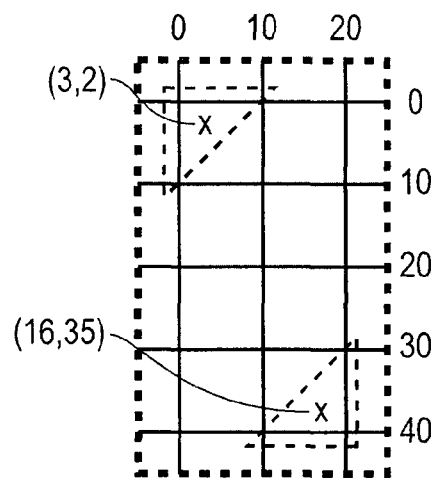

FIG. 4H shows the interpolated position of the two touches, T1 and T2, on the position sensor. In this example the position sensor has been divided into 80 possible positions.

Alternative interpolation methods may incorporate weighting factors, for example with the adjacent keys having a lower weighting than the keys Tn. Another example might be to weight according to expected hand shadow effects. Interpolation need not be done in a row-wise and column-wise manner as described above. For example, interpolation could be among all nearest neighbour keys, or all keys in the LAKS sub-block region previously defined for the key Tn. Many other variations of interpolation methods will be envisaged.

From the above it will thus be appreciated how in the first embodiment simultaneous multiple touches can be reliably detected by processing a single set of signals captured from a 2D capacitive touch sensor. In particular, the combined use of a localised version of the AKS process and interpolation allows coordinates of simultaneous multiple touches to be determined. Moreover, this is done using a relatively coarse grid of sensing elements with the interpolation providing resolution at a finer scale than defined by the sensing elements. In this way, relatively accurate multi-touch sensing is performed with a relatively small number of sense channels. In the illustrated example, only 8 sense channels are used.

The method of the first embodiment may be extended by taking account of the temporal evolution of the signals so that moving touches are tracked.

Figure 5:
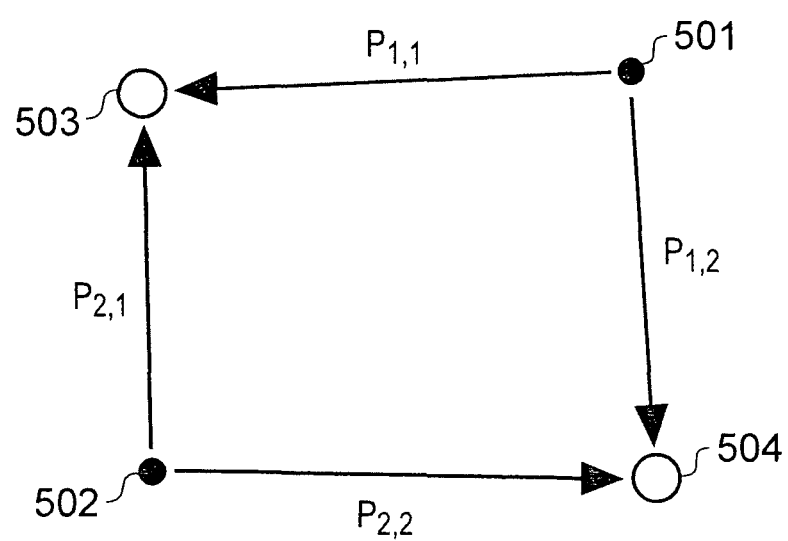
FIG. 5 is a schematic drawing illustrating the tracking of multiple objects adjacent to the sensor array of the first embodiment.

FIG. 5 shows an example in which two touches are tracked. There might be more than two objects to track. The process described here can be applied to any number of objects.

At time t1, two touches are sensed at positions 501 and 502. The location of these touches at time t1 has been found using the procedure described above. After a given time interval, the sensor is polled once again at a time t2. Once again two touches are sensed. These are located at positions 503 and 504. To determine which touch (i.e. 501 and 502) at time t1 tracks to which touch (503 or 504) at time t2, the path length of all of the possible paths between the touch locations is calculated. In the example in FIG. 5, there are four possible paths, which are labelled on FIG. 5 as P(1,1), P(1,2), P(2,1) and P(2,2). However, for this example there are only two possible combinations for tracking positions 501 and 502 to positions 503 and 504, namely:

501 tracks to 503 and 502 tracks to 504 (Combination 1)
501 goes to 504 and 502 tracks to 503 (Combination 2)

The total distance for each of the combinations is found by using the x- and y-coordinates of the four touch positions. The combination with the lowest distance value represents the smallest tracking distance for the two objects and therefore the most likely combination of tracking for the two objects. For example, if combination 1 has the lowest distance value then touch 501 tracks to touch 503 and touch 502 tracks to touch 504.

The host controller 209 will output on output line 210 a series of position coordinates of objects T1 to Tn at discrete times t1, t2 . . . . The host controller 209 will poll the position sensor at fixed or variable time intervals. After polling the position sensor the host controller will compute whether or not the object that is detected is a new object, or the same object which has moved to another location on the position sensor. To determine which of these two scenarios is true (i.e. a new object or an old object which has changed location), the host controller could use the data from consecutive polling cycles. For example, if one object is present in two consecutive polling cycles, then the host controller will consider this to be the same object moving to an alternative location. This will trigger the tracking of this object. However, if in the next polling cycle the object is not detected then the touch would be disregarded. Moreover, if after a further two consecutive polling cycles a new object was detected on the position sensor, it would be tracked in the manner described above.

To illustrate the tracking of objects over a period of 10 time intervals, a series of coordinates of detected touches output on line 210 is shown in the table below. The two detected touches on FIG. 4H are used as a starting point. For this example, only two touches can be detected on the position sensor at any one time. The table shows both discrete touches (i.e. not tracked), and tracked touches.

| Time interval | T1 discrete | T2 discrete | T1 tracked | T2 tracked |
|---|---|---|---|---|
| T1 | (3, 2) | (16, 35) | — | — |
| T2 | (4, 2) | (18, 35) | (4, 2) | (18, 35) |
| T3 | — | — | (5, 10) | (20, 30) |
| T4 | — | — | (10, 15) | (18, 26) |
| T5 | — | — | (15, 15,) | — |
| T6 | — | (0, 40) | (15, 20) | — |
| T7 | — | (5, 36) | (10, 20) | (5, 36) |
| T8 | — | — | — | (10, 36) |
| T9 | — | — | — | (15, 36) |
| T10 | (5, 12) | — | — | (15, 30) |

Alternatively, to compute the tracking of objects the host controller could use a maximum allowable tracking distance, over which one object can track from one position to another. For example, if a single touch was detected on the position sensor at one time interval and then a second touch was detected at the next time interval, but the distance between the two touches was above the predetermined maximum distance, then this would be treated as a new object and not the same object moving to another position. Moreover, the tracking process could be a combination of the method described further above and the method described here.

A method for sensing multiple touches according to the first embodiment has been described. Another embodiment of the current invention will now be described.

Figure 6A:
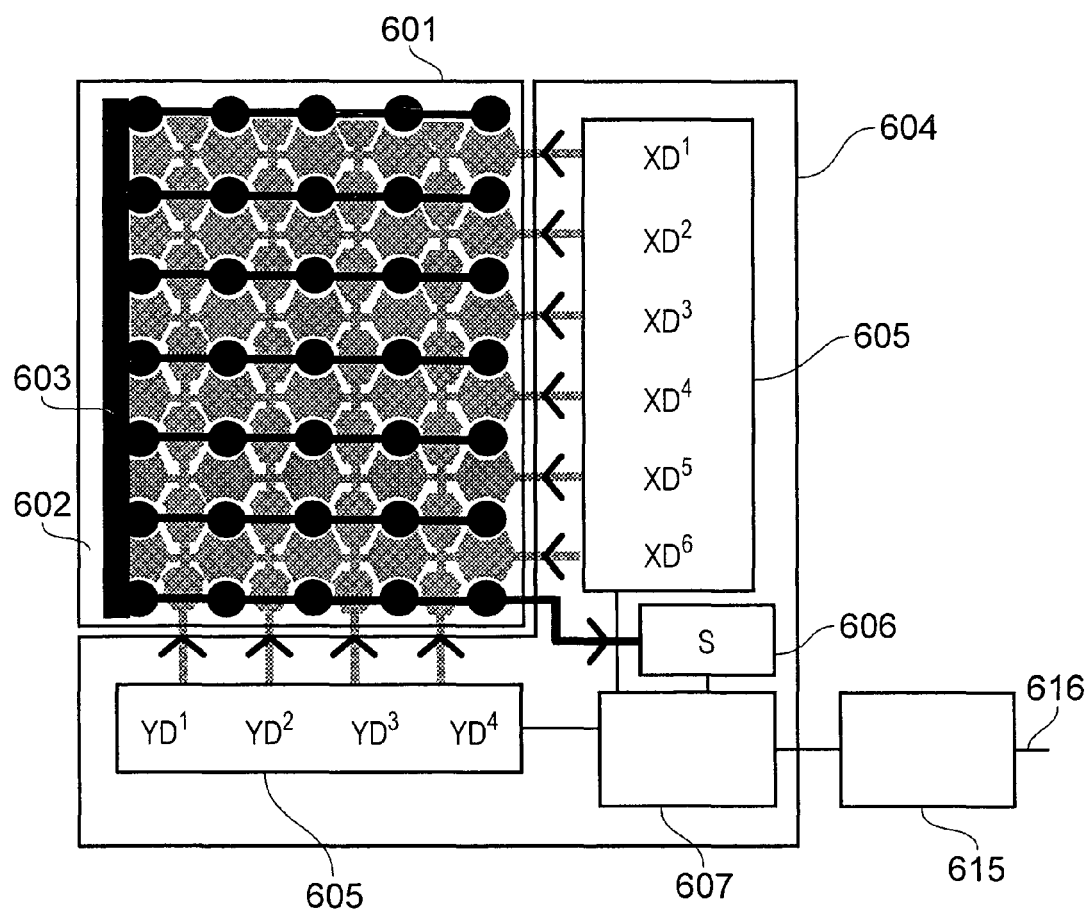
FIG. 6A is a schematic view of the top of a capacitive position sensor array and associated circuitry according to a second embodiment of the invention.
Figure 7:
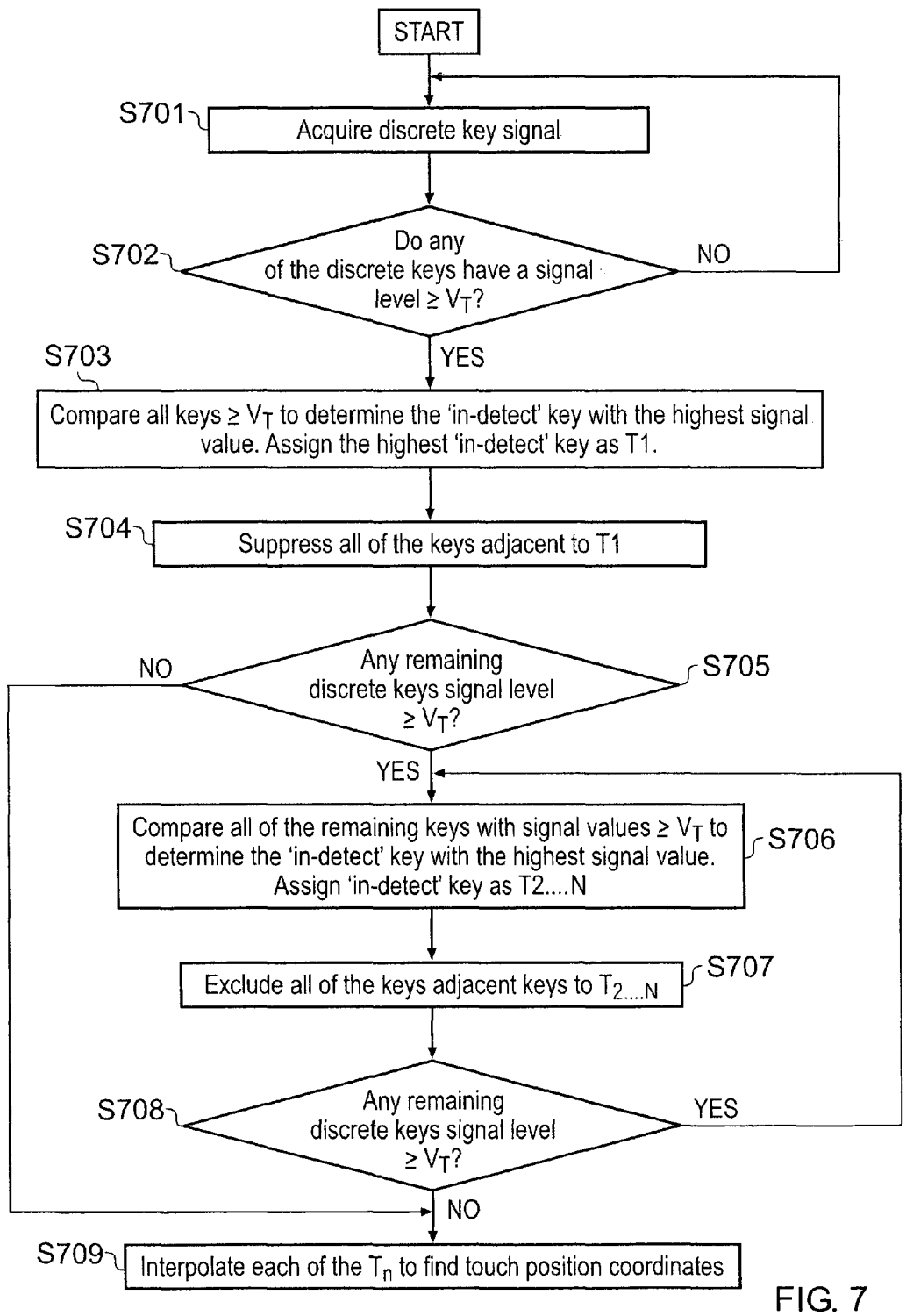
FIG. 7 is a flow chart of the signal processing method of the second embodiment.

FIG. 6A schematically shows in plan view a 2D touch-sensitive capacitive position sensor 601 according to another embodiment of the invention. The 2D touch-sensitive capacitive position sensor is used to describe how the algorithm shown in FIG. 7 is used to compute the position of multiple objects adjacent to the position sensor.

The 2D touch-sensitive capacitive position sensor 601 is operable to determine the position of an object along a first (x) and a second (y) direction. The sensor 601 comprises a substrate 602 bearing an electrode pattern 603 defining a sensitive area of the sensor and a controller 604. In this embodiment the electrode pattern is on both sides of the substrate. In other examples the electrode pattern 603 may be arranged on one side of the substrate.

The electrode pattern 603 on the substrate 602 can be provided using conventional techniques (e.g. lithography, deposition, or etch techniques). The substrate 603 in this example is of a transparent plastics material, in this case Polyethylene Terephthalate (PET). The electrodes comprising the electrode pattern are of a transparent conductive material, in this case Indium Tin Oxide (ITO). Thus the sensitive area of the sensor as a whole is transparent. This means the sensor may be used over an underlying display without obscuration. However, in other embodiments the sensor might be non-transparent, e.g. comprising a conventional printed circuit board, or other, substrate with a copper electrode pattern, e.g. for use in a mobile telephone keypad.

The controller 604 provides the functionality of drive units 605 for supplying drive signals to portions of the electrode pattern 603, a sense unit 606 for sensing signals from other portions of the electrode pattern 603, and a processing unit 607 for calculating the position of any objects adjacent to the position sensor, based on the different sense signals seen for drive signals applied to different portions of the electrode pattern. The controller 604 thus controls the operation of the drive and sense units, and the processing of responses from the sense unit 606 in the processing unit 607, in order to determine the position of objects, e.g. a finger or stylus, adjacent to the position sensor 601. The drive unit 605, sense unit 606 and processing unit 607 are shown schematically in FIG. 6A as separate elements within the controller. However, in general the functionality of all these elements will be provided by a single integrated circuit chip, for example a suitably programmed general purpose microprocessor, or field programmable gate array, or an application specific integrated circuit.

Figure 6B:
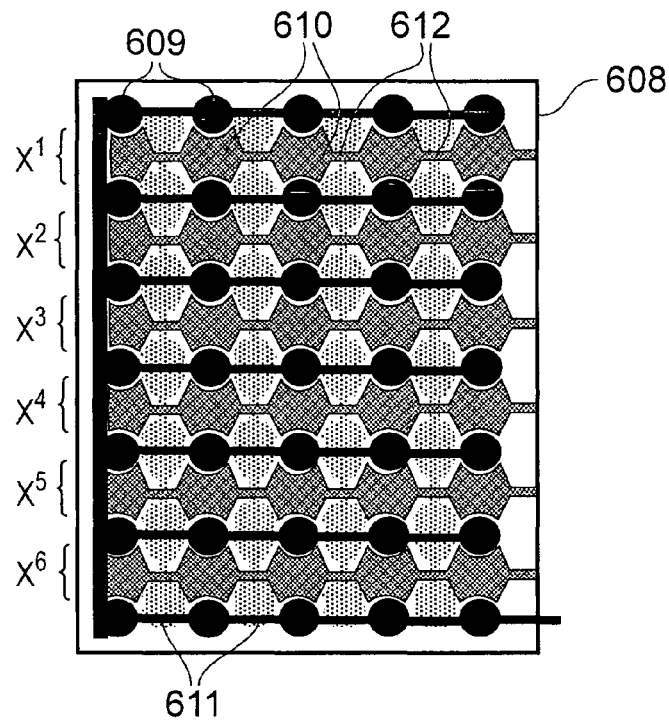
FIGS. 6B and 6C schematic illustrate the electrode pattern layers providing the X and Y lines in the sensor array of FIG. 6A.
Figure 6C:
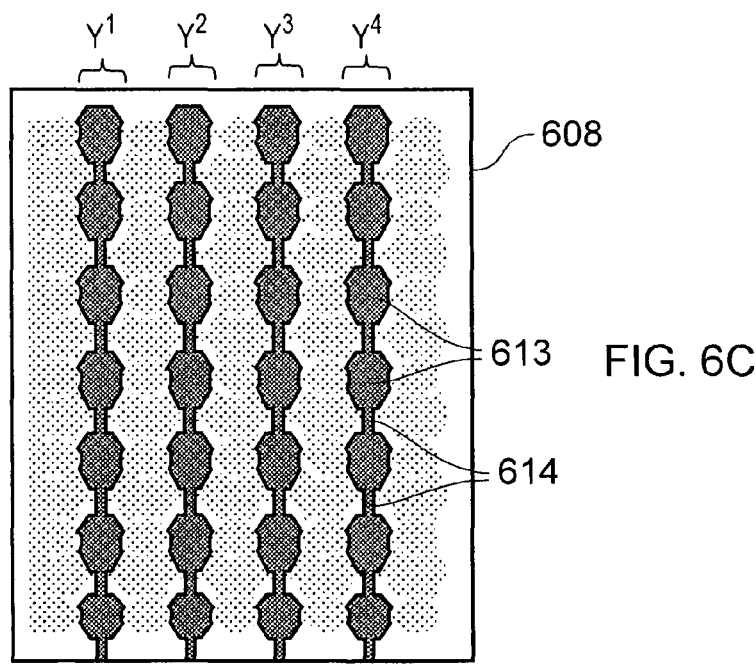

FIGS. 6B and 6C schematically shows respective views of electrode patterning on a front surface and a rear surface of a substrate of a 2D capacitive position sensor 601.

It is noted that FIG. 6B is referred to as a front view and FIG. 6C is referred to as a rear view. However, it will be appreciated that the terms "front" and "rear" are used for convenience to refer to opposing sides (faces) of the sensor substrate. The terms are not intended to imply any particular spatial orientation for the sensor or its substrate. The term front will generally be used to identify the side of a sensor which typically faces an object to be sensed when the sensor is in normal use. The term rear will generally be used to identify the opposing face (i.e. the face which typically faces away from an object to be sensed in normal use). Even so, it will be appreciated that in many, if not all, cases the sensor substrate will be fully reversible in that the sensor will operate regardless of which side a pointing object approaches from (i.e. regardless of which side is considered the front side and which side is considered the rear side).

The electrode patterning on the front side of the substrate (FIG. 6B) comprises a plurality of interconnected sense elements 609 (shown black) and a plurality of drive elements 610 (shown medium grey).

The sense elements 609 are generally circular in shape and arranged in a regular 5×7 array across the sensor substrate. The sense elements 609 are interconnected by an appropriate arrangement of sense elements connection traces 611 (also shown black in FIG. 6B). This is achieved in this example by directly connecting each sense element to its neighbours in horizontal rows. The horizontal rows of directly connected sense elements are then connected together by a connection trace running down the left-hand side of the electrode patterning shown in FIG. 6B. Thus all of the sense elements are connected together to provide a single sense electrode comprising interconnected sense elements distributed in both dimensions across the 2D sensitive area of the sensor. The sense electrode is coupled via sense electrode wiring to a sense channel S in a sense unit within the controller of the sensor (e.g. a controller such as shown in FIG. 6A). The sense channel S is controlled by the controller to determine an amount charge coupled into the interconnected group of sense elements.

The drive elements 610 on the side of the substrate shown in FIG. 6B are arranged in a regular 5 by 6 array across the sensor substrate. Respective ones of the drive elements are located adjacent to and between respective ones of the sense elements 609. This arrangement thus provides columns of alternating sense and drive elements. The drive elements and the sense elements are closely spaced apart from one another. The drive elements 610 are generally hexagonal (non-regular in this example), but with inwardly curved edges on sides adjacent to the sense elements 609 to accommodate the circular shape of the sense elements. The drive elements in each row are connected together by an appropriate arrangement of drive elements connection traces 612 (also shown medium grey in FIG. 6B)

Thus the plurality of drive elements 610 on the side of the sensor substrate shown in FIG. 6B may be considered as being arranged into six row electrodes $X^1, X^2, X^3, X^4, X^5$, and $X^6$. For the orientation shown in FIG. 6B, these row electrodes run horizontally and are spaced apart from each other vertically. The terms vertical and horizontal, top and bottom, and so on, will generally be used herein to refer to the orientations of sensors as shown in the drawings, unless the context demands otherwise. It will be appreciated that the terms are not intended to refer to any particular orientation for a sensor when it is in normal use. Furthermore, it will be appreciated the terms column and row are used merely as labels to allow ready distinction between two different arbitrary directions, in this case between a vertical and a horizontal direction, but in general the rows and columns need not be orthogonal.

Each row of drive elements (i.e. each row electrode) is coupled via row drive wiring to a respective drive channel $XD^1, XD^2, XD^3, XD^4, XD^5$ and $XD^6$ within the drive unit of the controller of the sensor. In this example a separate drive channel is provided for each row electrode. However, a single drive channel with appropriate multiplexing may also be used. The drive channels are controlled by the controller to apply drive signals to respective ones of the rows of drive elements (row electrodes) as described further below.

The electrode patterning of the rear side of the substrate (FIG. 6C) comprises a further plurality of drive elements 613 (again shown as medium grey in the Figure). These drive elements 613 are arranged in a regular 4 by 7 array across the sensor substrate. The location of the drive elements 613 on this side of the substrate relative to the electrode patterning on the face of the substrate shown in FIG. 6B can be seen in FIG. 6C from the light grey representation of the electrode patterning shown in FIG. 6B. Thus the drive elements 613 on the rear of the substrate are located (in projected plan view) between the sense elements 609 so as to provide rows of alternating sense and drive elements. The drive elements 613 and the sense elements (in projection) do not overlap. The drive elements 613 are generally hexagonal, but with inwardly curved cut-aways at corners adjacent to the projection of the sense elements 609 onto the rear side of the substrate to accommodate the circular shape of the sense elements without overlapping. The drive elements 613 in each column are connected together by an appropriate arrangement of drive elements column connection traces 614 (also shown medium grey in FIG. 6B).

Thus the plurality of drive elements 613 on the rear side of the sensor substrate shown in FIG. 6C may be considered as being arranged into four column electrodes $Y^1, Y^2, Y^3$ and $Y^4$. These column electrodes run vertically and are spaced apart from each other horizontally for the orientation shown in FIG. 6C.

Each column of drive elements 613 is coupled via column drive wiring to a respective drive channel $YD^1, YD^2, YD^3$ and $YD^4$ within the sensor controller. These drive channels may be identical to the drive channels $XD^1, XD^2, XD^3, XD^4, XD^5$ and $XD^6$ coupled to the row electrodes. In this example a separate drive channel is provided for each column electrode. However, a single drive channel with appropriate multiplexing may also be used. The drive channels are controlled by the controller to apply drive signals to respective ones of the columns of drive elements 613 as described further below. (A single drive channel with appropriate multiplexing may provide the functionality of all drive channels $XD^1, XD^2, XD^3, XD^4, XD^5, XD^6, YD^1, YD^2, YD^3$ and $YD^4$.)

FIG. 6A schematically shows a front plan view of the sensor 608 shown in FIGS. 6B and 6C in which the electrode patterning on both the front side (FIG. 6B) and the rear side (FIG. 6C) are shown together.

Thus the sensor 608 comprises a plurality of driven row electrodes, a plurality of driven column electrodes, and a single sense electrode comprising a network of interconnected sense elements interspersed among the driven row and column electrodes across the sensitive area of the position sensor. Each neighbouring pairing of a drive element 610, 613 and a sense element 609 (as seen in projection, i.e. regardless of whether the drive and sense element are on the same side of the substrate) can be considered to correspond to a discrete position sensor area. In use, the position of an object is determined in a measurement acquisition cycle in which the column and row electrodes are sequentially driven by their respective drive channels and the amount of charge transferred to the sense electrode from each driven row and column electrode is determined by the sense channel, as described in U.S. Pat. No. 6,452,514.

The signal values indicative of an applied capacitive load, measured by the sense unit 606 are provided to the processing circuitry 607. The position sensor will be treated as a series of discrete keys. The positions of the discrete keys are at the intersections of the x- and y-drive elements. The processing circuitry 607 is configured to determine a signal value, indicative of an applied capacitance load associated with it, for each of the discrete keys. The position of the discrete keys and the associated signal values, indicative of an applied capacitive load are reported to a host controller 615. The host controller 615 will compute how many touches are on the position sensor and will interpolate the positions of the multiple touches. The host controller may be a single logic device such as a microcontroller. The microcontroller may preferably have a push-pull type CMOS pin structure, and an input which can be made to act as a voltage comparator. Most common microcontroller I/O ports are capable of this, as they have a relatively fixed input threshold voltage as well as nearly ideal MOSFET switches. The necessary functions may be provided by a single general purpose programmable microprocessor, microcontroller or other integrated chip, for example a field programmable gate array (FPGA) or application specific integrated chip (ASIC).

The layout and function of the 2D touch-sensitive capacitive position sensor 601 in FIG. 6A has been described. FIG. 7 and FIG. 8 are now referred to assist description of how the 2D touch-sensitive capacitive position sensor 601 of FIG. 6A is used to find the position of single or multiple touches of the position sensor.

FIG. 7 is a flow diagram showing steps of the signal processing method embodied in hardware, firmware or software in the host controller 615. FIGS. 8A to 8E show the 4×6 array of touch buttons in the touch panel of the second embodiment in sequence at various points in the processing for the example set of touch inputs.

FIG. 8A shows a 4×6 grid with the raw data values of the signals acquired in a single acquisition in Step S701 of FIG. 7. Each of the grid squares represents one of the discrete keys of the capacitive position sensor 601. Two simultaneous finger touches are present at the positions indicated by the dashed lines. The raw data values are stated in arbitrary units. There is one finger touch near the top left of the panel and another finger touch near the bottom right of the panel.

FIG. 8B shows as shaded panels the positions of the five keys that have returned signals above the threshold, i.e. the in-detect keys. Each of the discrete keys is denoted by K(a,b), where 'a' is the column position, starting from '1' on the left of the grid and where 'b' is the row position, starting from '1' at the top of the grid (i.e. the shaded element 802 in FIG. 8B is K(1,1)). The location of the in-detect keys is K(1,1), K(2,2), K(3,3), K(3,5) and K(4,5).

In Step S701, the signal values of each of the discrete keys are acquired from the processing circuitry 607, which are indicative of an applied capacitive load to the position sensor 601.

In Step S702, it is determined whether there are any signals above threshold. If none of the signals acquired from the processing circuitry 607 is in-detect, the algorithm returns to Step S701 and acquires a new set of discrete key signal values. This will continue until either at least one of the discrete key signal value is greater than or equal to Vt or the loop is terminated by an appropriate control signal. It will be appreciated that the time interval between signal acquisitions may be increased with time if no above-threshold signals are received in order to save power. Another option is for the touch panel device to deactivate completely after a certain period of no signals being received above threshold, requiring a separate control input to reactivate, i.e. enter a sleep mode.

In Step S703, all of the in-detect signal values are compared to one another to find the discrete key with the highest signal value. The highest in-detect signal value is that of the discrete key at location K(2,2) 803. The key with the highest signal value of the in-detect discrete keys is label as T1 803.

In Step 704 all of the keys which are adjacent to the assigned key T1 803 are suppressed, such that these keys will be ignored in further processing steps. The region of the position sensor which is adjacent to the assigned touch T1 803 is shown by a dashed boundary 804 in FIG. 8C.

FIG. 8C shows the position of two keys that have been suppressed by the now unshaded grid squares in Step S704 805. The suppressed keys are at grid location K(1,1) and K(3,3).

In Step S705, the signal values of the remaining discrete keys are compared to the threshold value Vt. If none of the remaining key signals is greater than or equal to the threshold value Vt, then the process flow jumps to Step S709. On the other hand, if there are in-detect array keys with a signal value greater than or equal to the threshold value Vt, the assignment of a touch position is repeated, based on the key with the next highest signal value. With the example inputs shown in FIG. 8C, the remaining in-detect discrete key signal values lie at locations K(3,5) and K(4,5).

In Step S706, the signal values from the remaining in-detect keys are compared with one another to find the highest. The highest signal value is at discrete key location K(4,5) 806 in the example, which is labelled at T2.

In Step 707 all of the keys which are adjacent to the assigned key T2 806 are suppressed, such that these keys will be ignored in further processing steps. The region of the position sensor which is adjacent to the assigned touch T2 806 is shown by a dashed boundary 807 in FIG. 8C.

FIG. 8D shows the location of the key is suppressed by the now unshaded discrete location K(4,5) 808.

In Step S708, any remaining discrete key signal values are compared to the threshold value Vt. If none of the remaining key signals are greater than or equal to the threshold value Vt (as in the illustrated example), then Step S709 of the algorithm is executed. However, if there are any keys remaining with above-threshold signal values, the algorithm is repeated from Step S706 to S708 to assign a further discrete key T3. This process is repeated until Step S708 returns a null value.

At this point in the process, the assignment of the position of the touches on the position sensor is finished, and the process moves to a further stage, namely an interpolation step.

In Step S709, interpolation is carried out. The interpolation procedure is the same as already described above for the first embodiment.

Moreover, tracking of touches may also be carried out in order to provide collated output from the processor, where coordinates from successive data samples are output in streams if they are considered to be from the same object moving over the touch panel. The tracking can be carried out in the same way as already described above in connection with the first embodiment.

The host controller 615 will output on output line 616 a series of position coordinates of objects T1 to Tn at discrete times t1, t2 . . . . The host controller 616 will poll the position sensor 601 at fixed time intervals.

It is noted that in the second embodiment, it is possible to detect multiple touches on the position sensor which have a separation of only one discrete key. The signal value from the discrete key is shared during the computation of the coordinates of the touches on the position sensor. Preferably in this situation, the interpolation algorithm is weighted so that shared keys are given reduced weighting, for example half weighting. Although in principle it is desirable to be able to detect multiple touches that are close together, it is noted that in the second embodiment this comes at a potential cost of loss of reliability, in that the two close touches output by the processor in the second embodiment may not in reality be two distinct actuations, but could be a single actuation by a larger object, and these two possibilities are not distinguishable.

The second embodiment may thus be considered to be a simplified version of the first embodiment. There are two principal simplifications. First, there is no requirement for one of the capacitance signal values to be below a minimum value (i.e. no analogue of Step S303 of the first embodiment). Second, the form of localised AKS carried out in the second embodiment is primitive in that the key with the highest signal value in the region is the one that is selected. It will be appreciated that features from the two embodiments can be interchanged. For example, the first embodiment could be simplified by removal of the requirement for one of the capacitance signal values to be below a minimum value.

It will be appreciated that many variations are possible on the above embodiments.

For example, the size of the LAKS regions can be varied to include: only the 4 directly adjacent neighbours above and below; all 8 directly adjacent neighbours (as in the illustrated examples); or next nearest neighbours as well as nearest neighbours.

Another variation would be to iterate the identification of the selected keys $T_1, T_2, \ldots T_N$ until all sense elements on the touch panel are covered by at least one LAKS region, and only thereafter apply a threshold test.

Another variation relates to interpolation, wherein the touch location is determined by interpolating between all signal values in the LAKS region. This avoids having to perform a processing step of selecting a particular element within the LAKS region as being the principal one on which subsequent interpolation is based.

It is also observed that the methods of the first and second embodiments could omit the interpolation steps, in which case the touch location in each region would be taken to be the basic output from the LAKS algorithm. This would be the preferred option if there was a one-to-one mapping between the "soft" keys of the touch panel, e.g. when the soft keys emulate a keypad, and the sensing elements, i.e. the sensor positions defined by the electrode patterning.

It will also be appreciated that although the position sensor 201 has been used to describe the first embodiment of the present invention and position sensor 601 has been used to describe the second embodiment of the present invention, these are interchangeable. Position sensor 201 is an example of a so-called passive sensor in which the capacitance value is a value established between the sensing electrode and a reference potential, such as electrical ground, whereas position sensor 601 is an example of a so-called active sensor in which the capacitance value is a measure of capacitive coupling between a polling line and a sensing line, the amount of coupling being affected by, and hence being a measure of, an actuating object. It will be appreciated that any form of passive or active sensor may be used for the touch panel, not only the two specific examples described above. Moreover, although rectangular or square arrays of sensing elements are most common and provide convenience, it would be technically feasible to provide other distributions of sensing elements. Moreover, the sensing elements need not be formed of arrays of grid lines in x and y. They may be formed of discrete keys. Moreover, the sensing elements may be distributed in equal or unequal spacings.

It will be appreciated that the invention may be applied in mouse-type applications, i.e. with touchpads emulating mouse activity, including the modes of use described in U.S. Pat. No. 5,825,352, which are incorporated herein by reference, such as "point and click", "point and double click", "drag", "drag and click", "drag lock", and "ink" as defined therein.

Figure 9A:
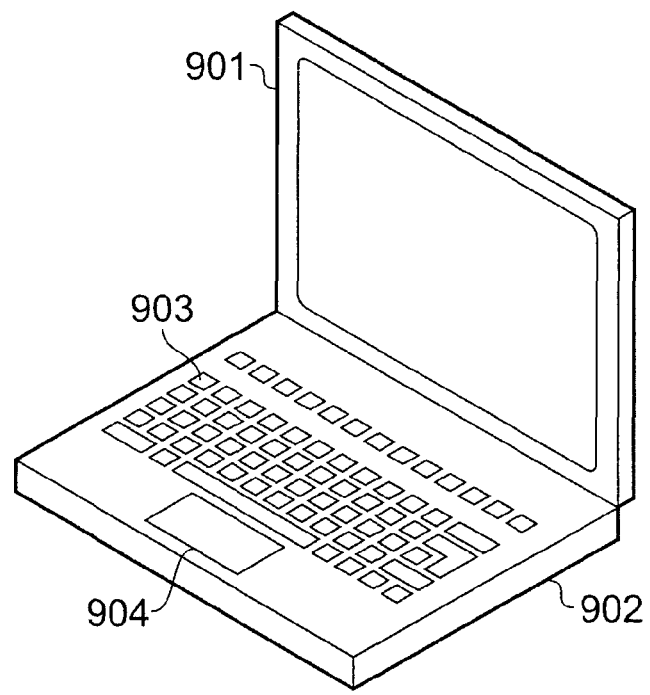
FIG. 9A schematically shows a display monitor and an input device, which includes a sensor according to the present invention.

FIG. 9A schematically shows the display monitor 901 and an input device 902 of a personal computer. In this example the input device 902 includes an alpha-numeric keyboard 903 for the user to input characters into the personal computer and a touchpad 904, which could be either of the capacitive sensors which are described in the present invention. It will be appreciated that the touchpad 904 could be a separate device to the keyboard 903. A conventional computer touchpad might also include a number of 'mouse-buttons' so that the user can operate a cursor, and select items by clicking one of said mouse-buttons. Although a conventional touchpad offers the possibly of moving a cursor on the display monitor by moving a finger over the touchpad's surface or as a mouse-button by tapping the touchpad's surface with a finger, the conventional touchpad cannot be used to perform both of these functions simultaneously. It will be appreciated that the personal computer could be contained within the display monitor 901 or the touchpad 904 could be one of the input devices of a laptop computer.

The touchpad 904 described in the present invention allows the user to use two separate fingers to operate two different functions of the personal computer. For example the user can move a cursor displayed on the display monitor 901 using one finger on the touchpad's surface, while using a separate finger to tap the surface of the touchpad 904, like a mouse-button, to select items. This could be used to organise data files, by first moving the cursor displayed on the display monitor 901 with a first finger on the touchpad's surface, until it is positioned over the required data file. The data file is selected by placing a second finger on the touchpad's surface. The data file is then moved to a different location by moving the first finger across the touchpad's surface, while the second finger is kept in contact with the touchpad's surface. When the data file is in the new desired location the second finger is removed from the touchpad's surface and the data file is deselected. It will be appreciated that in the above description, the second finger could also be moved at the same time as the first finger thus, allowing the user to carry out this function with one hand.

A further function which could be implemented with the present invention is the ability to 'paint' using a personal computer, using a first finger as a brush and a second finger to select the required colour from an on-screen palette. The first finger is used on the surface of the touchpad 904 to control a conventional primary cursor to draw an image on the computer, which is displayed on the display monitor 901. Implemented within the software and displayed on the display monitor 901 would be a palette of colours that can be readily selected. The user would move a secondary cursor over the required colour of the palette, which could be selected using a 'tap' on the touchpad 904 using the second finger. The user could also use the secondary cursor to change the type of brush or the size brush, in addition to the colour in the method described above. This would allow the user more freedom when drawing an image, because the user could keep the primary cursor (brush) on the image at all times.

Figure 9B:
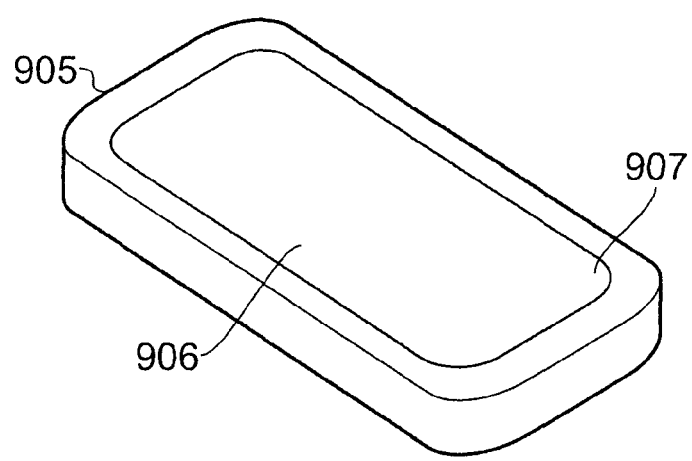
FIG. 9B schematically shows a cellular telephone incorporating a sensor according to the present invention.

FIG. 9B schematically shows a cellular telephone 905 incorporating a touchpad sensor 907 according to the present invention. The touchpad sensor is incorporated in front of the display screen 906 such that the display screen can still be viewed by the user, while still allowing capacitive coupling between the user's finger or stylus and the touchpad sensor 907. In this example of the present invention, the user can select and move items displayed on the display screen by using a finger or stylus on the touchpad. The touchpad is incorporated with the display screen therefore, the 'cursor' will follow the movement of the user's finger or stylus. The same functions as those described for FIG. 9A above, could be applied to this example of the present invention shown in FIG. 9B.

Alternatively the touchpad 907 area could be divided up such that an area of the sensor was used to only view the display screen 906 and an area of the sensor was to used only as a conventional touchpad sensor, whereby the user could move a cursor and select items, in the same manner described above.

A further function which could be implemented with the present invention is the control of a game on the cellular telephone 905. Although the touchpad 907 covers the same area as the display screen 906, it could be divided up such that there are user controls on the left and right of a central display area. The user would be able to use two fingers or thumbs, one on each of the left and right sides of the touchpad 907, such that he or she could control two different functions of a game. For example the left portion of the touchpad 907 could be a movement control including up, down, left and right and the right control portion of the touchpad 907 could be a series of buttons. For example this could be used in a driving game where the left and right movement controls on the left of the touchpad 907 are used to steer and the buttons on the right of the touchpad 907 are used to accelerate and slow down the vehicle in the game.

In summary, it will be understood from the above that a capacitive touch panel can be provided which is capable of detecting multiple simultaneous touches. The touch panel delivers sets of capacitance signal values to a processor which computes the coordinates of single or multiple touch locations on the touch panel. The processing of each set is performed by (i) identifying the sensing element having the largest capacitance signal value; (ii) defining a region around that sensing element; and (iii) repeating the process iteratively, wherein each subsequent identifying step excludes signals that lie in previously defined regions. A multi-touch sensor is thus provided in which the signal processing is based on successive definition of regions or sub-blocks in the touch panel. The touch location in each region can be determined more accurately by then applying interpolation between the adjacent signal values. This allows for position resolution at a finer scale than that defined by the touch panel's electrode patterning.

REFERENCES

[1] U.S. Pat. No. 5,825,352
[2] U.S. Pat. No. 5,463,388
[3] EP 1335318 A1
[4] U.S. Pat. No. 6,993,607
[5] U.S. Pat. No. 6,452,514
[6] U.S. Pat. No. 5,730,165
[7] U.S. Pat. No. 6,466,036

The invention claimed is:
1. A two-dimensional touch-sensitive capacitive position sensor comprising:
  a touch panel having a plurality of sensing elements distributed over its entire area;
  a capacitance measurement circuit connected to the sensing elements and operable repeatedly to acquire sets of capacitance signal values, each set being made up of a capacitance signal value from each of the sensing elements; and
  a processor connected to receive the sets of capacitance signal values and operable to sequentially process each set by performing operations comprising:
    (a) identifying a sensing element that has a capacitance signal value that exceeds a threshold and that has a largest capacitance signal value from within the plurality of sensing elements distributed over the entire area of the touch panel that exceeds all other capacitance values for the plurality of sensing elements distributed over the entire area of the touch pad, including comparing the capacitance value of each of the plurality of sensing elements that exceeds the thresh- old with the capacitance value of at least one of the other of the plurality of sensing elements;

(b) defining a region within the entire area of the touch panel comprising the identified sensing element having the largest capacitance signal value and each sensing element that is immediately adjacent the identified sensing element whether or not each sensing element that is immediately adjacent the identified sensing element has a capacitance value that exceeds the threshold, the defining including determining which of the plurality of sensing elements are immediately adjacent the identified sensing element;

(c) selecting, from the defined region a particular sensing element within the defined region to be associated with a touch of the touch panel;

(d) excluding from future consideration as a sensing element having a largest capacitance signal value any sensing element within the defined region;

(e) identifying another sensing element that has a capacitance signal value that exceeds the threshold and that has a largest capacitance value from the plurality of sensing elements that exceeds all other capacitance values for the plurality of sensing elements distributed over the entire area of the touch pad, excluding any excluded sensing elements, including comparing the capacitance value of each of the plurality of sensing elements, excluding any excluded sensing elements, with at least one of the other of the plurality of sensing elements, excluding any excluded sensing elements;

(f) defining another region within the entire area of the touch panel comprising the another identified sensing element having a largest capacitance signal value and each sensing element that is immediately adjacent the another identified sensing element whether or not each sensing element that is immediately adjacent the identified sensing element has a capacitance value that exceeds the threshold, the defining another region including determining which of the plurality of sensing elements are immediately adjacent the another identified sensing element;

(g) selecting, from the another defined region a particular sensing element within the another defined region to be associated with another touch of the touch panel;

(h) excluding from future consideration as a sensing element having a largest capacitance signal value any sensing element within the another defined region; and (i) repeating steps (e), (f), (g), and (h) until all of the plurality of sensing elements that have a capacitance signal value that exceeds the threshold are identified as having a largest capacitance signal value or are excluded from future consideration for having a largest capacitance signal value.

2. The sensor of claim 1, wherein the particular sensing element that is selected to be associated with the touch comprises the sensing element having the largest capacitance signal value.

3. The sensor of claim 1, wherein the particular sensing element that is selected to be associated with the touch comprises a sensing element that is at a topmost position on the touch panel among sensing elements that have a capacitance signal value above a threshold value.

4. The sensor of claim 3, wherein a touch location in the region is taken to be at the particular sensing element that is selected to be associated with the touch.

5. The sensor of claim 1, wherein a touch location in the region is determined by applying interpolation between the capacitance signal values of at least some of the sensing elements in the region.

6. The sensor of claim 5, wherein the interpolation is limited to the particular sensing element that is selected to be associated with the touch and any neighboring sensor elements.

7. The sensor of claim 5, wherein the interpolation includes all sensing elements in the region.

8. A method sequentially performing the following:
(a) identifying a sensing element having a capacitance signal value that exceeds a threshold and that has a largest capacitance signal value from within the plurality of sensing elements distributed over the entire area of the touch panel that exceeds all other capacitance values for the plurality of sensing elements distributed over the entire area of the touch pad, including comparing the capacitance value of each of the plurality of sensing elements that exceeds the threshold with the capacitance value of at least one of the other of the plurality of sensing elements;

(b) defining a region within the entire area of the touch panel comprising the identified sensing element having the largest capacitance signal value and each sensing element that is immediately adjacent the identified sensing element whether or not each sensing element that is immediately adjacent the identified sensing element has a capacitance value that exceeds the threshold, the defining including determining which of the plurality of sensing elements are immediately adjacent the identified sensing element;

(c) selecting, from the defined region a particular sensing element within the defined region to be associated with a touch of the touch panel;

(d) excluding from future consideration as a sensing element having a largest capacitance signal value any sensing element within the defined region;

(e) identifying another sensing element having a capacitive signal value that exceeds the threshold and that has a largest capacitance value from the plurality of sensing elements that exceeds all other capacitance values for the plurality of sensing elements distributed over the entire area of the touch pad, excluding any excluded sensing elements, including comparing the capacitance value of each of the plurality of sensing elements, excluding any excluded sensing elements, with at least one of the other of the plurality of sensing elements, excluding any excluded sensing elements;

(f) defining another region within the entire area of the touch panel comprising the another identified sensing element having a largest capacitance signal value and each sensing element that is immediately adjacent the another identified sensing element whether or not each sensing element that is immediately adjacent the identified sensing element has a capacitance value that exceeds the threshold, the defining another region including determining which of the plurality of sensing elements are immediately adjacent the another identified sensing element;

(g) selecting, from the another defined region a particular sensing element within the another defined region to be associated with another touch of the touch panel;

(h) excluding from future consideration as a sensing element having a largest capacitance signal value any sensing element within the another defined region; and (i) repeating steps (e), (f), (g), and (h) until all of the plurality of sensing elements having a capacitance signal value that exceeds the threshold are identified as having a largest capacitance signal value or are excluded from future consideration for having a largest capacitance signal value.

9. The method of claim 8, wherein the particular sensing element that is selected to be associated with the touch comprises the sensing element having the largest capacitance signal value.

10. The method of claim 9, wherein a touch location in the region is taken to be at the particular sensing element that is selected to be associated with the touch.

11. The method claim 9, wherein a touch location in the region is determined by applying interpolation between the capacitance signal values of at least some of the sensing elements in the region.

12. The method of claim 11, wherein the interpolation is limited to the particular sensing element that is selected to be associated with the touch and any neighboring sensor elements.

13. The method of claim 11, wherein the interpolation includes all sensing elements in the region.

14. The method of claim 8, wherein the particular sensing element that is selected to be associated with the touch comprises a sensing element that is at a topmost position on the touch panel among sensing elements that have a capacitance signal value above a threshold value.

15. The method of claim 8, further comprising subtracting a background signal value from raw signal values of the plurality of sensing elements before identifying the sensing element having the largest capacitance signal value.

16. An apparatus comprising:
a processor communicatively coupled to a capacitance measurement circuit, the capacitance measurement circuit operable to acquire a capacitance signal value from each of a plurality of sensing elements of a touch panel, the processor operable to sequentially perform operations comprising:
  (a) identifying a sensing element having a capacitance signal value that exceeds a threshold and that has a largest capacitance signal value from within the plurality of sensing elements distributed over an entire area of the touch panel that exceeds all other capacitance values for the plurality of sensing elements distributed over the entire area of the touch pad, including comparing the capacitance value of each of the plurality of sensing elements that exceeds the threshold with the capacitance value of at least one of the other of the plurality of sensing elements;
  (b) defining a region within the entire area of the touch panel comprising the identified sensing element having the largest capacitance signal value and each sensing element that is immediately adjacent the identified sensing element whether or not each sensing element that is immediately adjacent the identified sensing element has a capacitance value that exceeds the threshold, the defining including determining which of the plurality of sensing elements are immediately adjacent the identified sensing element;
  (c) selecting, from the defined region a particular sensing element within the defined region to be associated with a touch of the touch panel;
  (d) excluding from future consideration as a sensing element having a largest capacitance signal value any sensing element within the defined region;
  (e) identifying another sensing element that has a capacitance signal value that exceeds the threshold and that has a largest capacitance value from the plurality of sensing elements that exceeds all other capacitance values for the plurality of sensing elements distributed over the entire area of the touch pad, excluding any excluded sensing elements, including comparing the capacitance value of each of the plurality of sensing elements, excluding any excluded sensing elements, with at least one of the other of the plurality of sensing elements, excluding any excluded sensing elements;
  (f) defining another region within the entire area of the touch panel comprising the another identified sensing element having a largest capacitance signal value and each sensing element that is immediately adjacent the another identified sensing element whether or not each sensing element that is immediately adjacent the identified sensing element has a capacitance value that exceeds the threshold, the defining another region including determining which of the plurality of sensing elements are immediately adjacent the another identified sensing element;
  (g) selecting, from the another defined region a particular sensing element within the another defined region to be associated with another touch of the touch panel;
  (h) excluding from future consideration as a sensing element having a largest capacitance signal value any sensing element within the another defined region; and
  (i) repeating steps (e), (f), (g), and (h) until all of the plurality of sensing elements having a capacitance signal value that exceeds the threshold are identified as having a largest capacitance signal value or are excluded from future consideration for having a largest capacitance signal value.

* * * * *